United States Patent
Ishii

(10) Patent No.: US 11,442,476 B2
(45) Date of Patent: Sep. 13, 2022

(54) FLOW CONTROLLER

(71) Applicant: Hitachi Metals, Ltd., Tokyo (JP)

(72) Inventor: Mamoru Ishii, Mie (JP)

(73) Assignee: Hitachi Metals Ltd., Tokyo (JP)

( * ) Notice: Subject to any disclaimer, the term of this patent is extended or adjusted under 35 U.S.C. 154(b) by 99 days.

(21) Appl. No.: 17/040,338

(22) PCT Filed: Mar. 12, 2019

(86) PCT No.: PCT/JP2019/009912
§ 371 (c)(1),
(2) Date: Sep. 22, 2020

(87) PCT Pub. No.: WO2019/188240
PCT Pub. Date: Oct. 3, 2019

(65) Prior Publication Data
US 2021/0018940 A1    Jan. 21, 2021

(30) Foreign Application Priority Data

Mar. 26, 2018 (JP) .............................. JP2018-057847

(51) Int. Cl.
*F16K 49/00* (2006.01)
*G05D 7/06* (2006.01)
*F16K 27/02* (2006.01)

(52) U.S. Cl.
CPC ........ *G05D 7/0658* (2013.01); *F16K 27/0236* (2013.01)

(58) Field of Classification Search
CPC .. G05D 7/0652; G05D 7/0658; G05D 7/0664; F16K 7/14; F16K 27/0236;
(Continued)

(56) References Cited

U.S. PATENT DOCUMENTS 4,170,245 A * 10/1979 Haley .................. G05D 7/0635
137/599.05
4,670,138 A * 6/1987 Yunoki .................. B01D 46/46
210/141

(Continued)

FOREIGN PATENT DOCUMENTS

JP            9330128 A      12/1997
JP         H11-65670 A       3/1999
(Continued)

OTHER PUBLICATIONS

PCT, "International Search Report and Written Opinion Regarding International Application No. PCT/JP2019/009912", dated May 14, 2019, pp. 10, Published in: JP.

*Primary Examiner* — Reinaldo Sanchez-Medina
(74) *Attorney, Agent, or Firm* — Neugeboren O'Dowd PC

(57) ABSTRACT

In a flow controller comprising a base with a gas passage formed inside, a flow sensor which measures a flow rate of the gas flowing through the passage, and at least two flow control valves which control the flow rate of the gas flowing through the passage, the flow sensor is configured so as to detect a total flow rate of the gas flowing through the passage, a part in the middle of the passage is branched into at least two branch passages, and at least one of said flow control valves is interposed in each of these branch passages. Thereby, even when a pressure difference ΔP1 between a primary side pressure P1 and a secondary side pressure P2 cannot be increased, the maximum flow rate of the gas can be made larger than before.

19 Claims, 7 Drawing Sheets

(58) Field of Classification Search
CPC ............ F16K 31/0641; F16K 31/0672; Y10T 137/87265; Y10T 137/87306; Y10T 137/87314
See application file for complete search history.

(56) References Cited

U.S. PATENT DOCUMENTS

| | | | | |
|---|---|---|---|---|
| 5,447,173 A * | 9/1995 | Kazama | ............... | G05D 7/0635 251/129.08 |
| 6,729,353 B2 * | 5/2004 | Nguyen | ................ | F16K 27/003 137/884 |
| 9,903,497 B2 * | 2/2018 | Ishii | .......................... | F16K 7/14 |
| 11,143,318 B2 * | 10/2021 | Goto | ......................... | F16K 7/17 |
| 11,226,641 B2 * | 1/2022 | Hirata | ................. | G05D 7/0635 |
| 11,231,026 B2 * | 1/2022 | Watanabe | .............. | F16K 31/365 |
| 2003/0042459 A1 * | 3/2003 | Gregoire | ............ | F16K 27/0236 251/331 |
| 2013/0269795 A1 * | 10/2013 | Yasuda | ................ | G05D 7/0106 137/488 |
| 2014/0034164 A1 * | 2/2014 | Yasuda | ................ | G05D 7/0617 137/599.01 |
| 2019/0178389 A1 * | 6/2019 | Sawada | ................ | G01F 15/003 |

FOREIGN PATENT DOCUMENTS

| | | |
|---|---|---|
| JP | H11237921 A | 8/1999 |
| JP | 2010230159 A | 10/2010 |
| JP | 2013065078 A | 4/2013 |
| JP | 2014032635 A | 2/2014 |
| WO | 2006101857 A2 | 9/2006 |

\* cited by examiner

FLOW CONTROLLER

BACKGROUND

Field

The present invention relates to a flow controller.

Background

A flow controller is an apparatus which comprises a flow sensor and a flow control valve and adjusts an opening of the flow control valve such that a flow rate of a gas measured by the flow sensor is in agreement with a target value. A flow controller has been widely used for the purpose of supplying a gas as a film forming material to semiconductor manufacturing equipment at a fixed feed rate. Some gases used for manufacturing a semiconductor are corrosive. For this reason, in a flow controller, it is common that a diaphragm valve in which a passage of a gas and a driving mechanism of a valve are airtightly separated by a metal barrier (namely, a diaphragm) is used as a flow control valve.

Typically, the diaphragm of the diaphragm valve used in a flow controller is a thin plate in a circular shape constituted by corrosion-resistant metal, such as stainless steel. A switching action of the diaphragm valve is performed by contacting a surface of the diaphragm to a seating surface of a valve seat, which separates a primary side passage from a secondary side passage of a valve, and detaching the surface of the diaphragm from the seating surface. Displacement of the diaphragm is performed by a pressing member prepared on an opposite side of the passage of a gas across the diaphragm.

The maximum flow rate of the diaphragm valve is dependent on a pressure difference $\Delta P1$ between a primary side pressure $P1$ and a secondary side pressure $P2$ of a valve and a cross section S of a gap formed between the seating surface of the valve seat and the surface of the diaphragm. Typically, the valve seat has a cylindrical shape and its annular end surface on a side of the diaphragm becomes the seating surface. Therefore, in order to increase the maximum flow rate when the pressure difference $\Delta P1$ is constant, it is effective to increase a cross section S of the gap (=l×d) by either means of lengthening a peripheral length l of the seating surface of the valve seat and extending a distance d between the seating surface of the valve seat and the surface of the diaphragm. The maximum value of the distance d in the latter means is determined by the size of a motion range of the pressing member of the diaphragm. When a drive unit which drives the pressing member is a piezo-electric element, the motion range of the pressing member is at most 50 micrometers, and it is difficult to extend the distance d.

On the other hand, as a flow control valve in which the maximum flow rate is increased by adopting the former means, a flow control valve having a seating surface of a valve seat which is extended to the vicinity of a periphery of a flat part of a diaphragm is described in Japanese Patent Application Laid-Open (kokai) No. H11-65670 (PTL1), for example. In accordance with this configuration, the peripheral length l of the seating surface becomes the longest as a valve seat which has a single seating surface with respect to a diaphragm having a flat part of a fixed size. Moreover, in a flow control valve described in Japanese Patent Application Laid-Open (kokai) No. 2010-230159 (PTL2), a plurality of inlet ports are formed in one side or the other side of a valve seat surface of a valve seat member or a seating surface of a valve element member, and a plurality of outlet ports are formed on either one or the other of the valve seat surface or the seating surface, and the inlet ports and the outlet ports are formed so as not to overlap in a seated state. In accordance with this configuration, as compared with a valve seat which has a single seating surface, a total sum of the peripheral length l of the seating surface can be increased.

By the way, in recent years, types of gases as film forming materials have been increasing in association with progress of a semiconductor manufacturing technology, and special gases which had not been used conventionally are used increasingly. For example, gases which contain precursors, such as an organic metallic compound and/or a metal halide, are described as film forming materials used for an atomic layer depositing method (ALD) in Japanese Patent Application Laid-Open (kokai) No. 2010-230159 (PTL2), for example. An atomic layer of metal or a metallic oxide, etc., is formed by carrying out chemical adsorption of these precursors on a substrate first to form a monolayer and making it react with other gas thereafter.

SUMMARY

According to an aspect, a flow controller comprises a base in which an inlet port and an outlet port of a gas are prepared on a surface of said base and a passage communicating said inlet port and said outlet port with each other is prepared inside said base. The flow controller also comprises a flow sensor which measures a flow rate of said gas flowing through said passage, and at least two flow control valves which have the same specification and control the flow rate of said gas flowing through said passage. Said passage comprises an inlet passage that is a space which communicates with said inlet port, a branching part that is a space which communicates with said inlet passage and branches a flow of said gas, branch passages that are at least two spaces which communicate with said branching part in parallel, a joining part that is a space which communicates with said branch passages and makes said flows of said gas join together, and an outlet passage that is a space which makes said joining part communicate with said outlet port. Said flow sensor is configured to detect a total flow rate of said gas which flows through said passage, and at least one of said flow control valves is interposed in each of said branch passages.

DETAILED DESCRIPTION

Technical Problem

Figure 1:
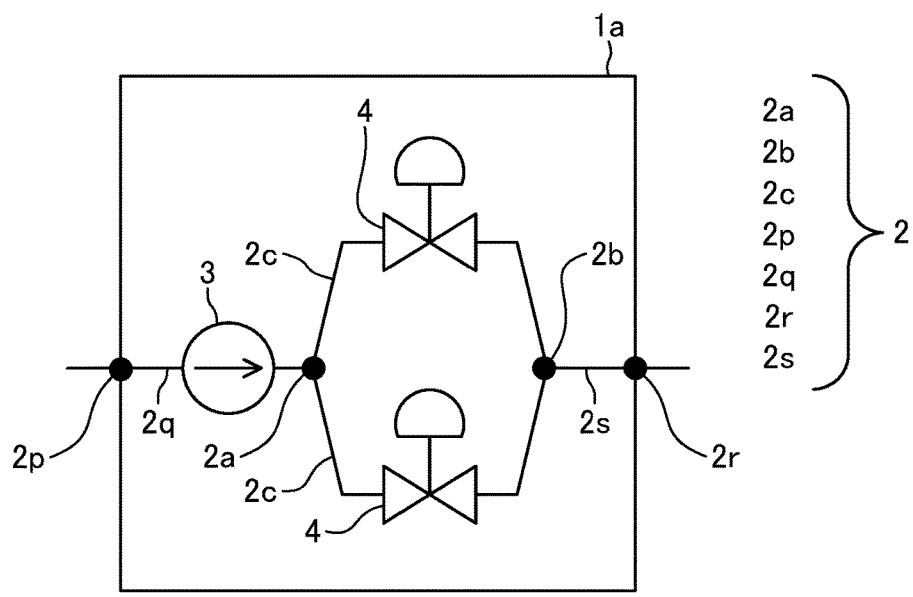
FIG. 1 is a schematic block diagram for showing an example of a configuration of a flow controller according to a first embodiment of the present invention (first apparatus).

Generally, the above-mentioned precursors, such as an organic metallic compound and a metal halide, have a large molecular weight, and are liquids (or solids) at an ordinary temperature and a normal pressure. Moreover, even though the precursors have been vaporized by heating, the precursors easily liquefy (or solidify) in association with temperature fall or pressure rise since its equilibrium vapor pressure is low. Therefore, in order to control flow rates of these gases and supply them to a semiconductor manufacturing equipment while preventing liquefaction (or solidification) of these gases, it is necessary to perform flow rate control while maintaining a temperature T at a high temperature and maintaining a state where the primary side pressure P1 and the secondary side pressure P2 do not exceed the equilibrium vapor pressure PE(T) at the temperature T. This means that the pressure difference ΔP1 between the primary side pressure P1 and the secondary side pressure P2 cannot be increased (since the equilibrium vapor pressure PE(T) is low). Therefore, in order to attain a desired flow rate in flow control of a gas having a low equilibrium vapor pressure, it is necessary to increase the cross section S of the gap of the diaphragm valve which the flow controller comprises.

In the flow control valve described in Japanese Patent Application Laid-Open (kokai) No. H11-65670 (PTL1), which has the seating surface of the valve seat extended to the vicinity of the periphery of the flat part of the diaphragm, the peripheral length l of the seating surface and the cross section S of the gap are the maximum as a valve seat which has a single seating surface with respect to a diaphragm having a flat part of a fixed size. However, when a pressure difference ΔP2 between a pressure P0 on the side where a pressing member of the diaphragm is disposed and the secondary side pressure P2 on the opposite side is large, the diaphragm may deform toward the secondary side passage (the diaphragm may warp such that its side of the secondary side passage may become convex).

Since a periphery part of the diaphragm is fixed to another member, as compared with a center part of the diaphragm, deformation at a position corresponding to the seating surface is smaller. However, as compared with a case where the pressure difference ΔP2 is sufficiently small, the distance of the gap between the diaphragm and the seating surface becomes smaller. As a result of such a deformation of the diaphragm, the cross section S of the gap becomes smaller and the flow rate of the gas falls. Moreover, since a shape of the secondary side passage is complicated, fluid resistance becomes larger and a coefficient of capacity (Cv value) becomes smaller. For this reason, a flow rate cannot be increased even though the cross section S of the gap is large.

Furthermore, in the flow control valve described in PTL2, the primary side passage and the secondary side passage branched so as to be in communication with each of the plurality of the inlet ports and the plurality of the outlet ports formed in either one or the other of the valve seat surface of the valve seat member or the seating surface of the valve element member are formed. For this reason, fluid resistance is large even though the cross section of the gap is large. On the other hand, since the gas with a low equilibrium vapor pressure easily liquefies in association with a rise in pressure as mentioned above, the pressure difference between the primary side pressure and the secondary side pressure cannot be increased. Therefore, when using the flow control valve for flow control of such a gas, it is difficult to increase the flow rate. In addition, since a plurality of the inlet ports and outlet ports are formed in the valve seat surface or the seating surface, it is difficult to completely close all the gaps when the valve is closed valve, and there is a possibility that the gas may leak.

The present invention has been conceived in view of the above-mentioned problems, and one objective of the present invention is to provide a flow controller which can make the maximum flow rate of a gas larger than before even in a case where the pressure difference ΔP1 between the primary side pressure P1 and the secondary side pressure P2 cannot be increased, such as a case where a gas with a low equilibrium vapor pressure PE(T) is used, for example.

Solution to Problem

A flow controller according to the present invention (which may be referred to as a "present invention apparatus" hereafter) is a flow controller comprising a base in which an inlet port and an outlet port of a gas are prepared on a surface of the base and a passage communicating the inlet port and the outlet port with each other is prepared inside the base, a flow sensor which measures a flow rate of the gas flowing through the passage, and at least two flow control valves which control the flow rate of the gas flowing through the passage.

In the present invention apparatus, the passage comprises an inlet passage that is a space which communicates with the inlet port, a branching part that is a space which communicates with the inlet passage and branches a flow of the gas, branch passages that are at least two spaces which communicate with the branching part in parallel, a joining part that is a space which communicates with the branch passages and makes the flows of the gas join together, and an outlet passage that is a space which communicates the joining part the outlet port. Moreover, the flow sensor is configured so as to detect a total flow rate of the gas which flows through the passage. Furthermore, at least one of the flow control valves is interposed in each of the branch passages.

In a preferred aspect of the present invention, the flow control valve comprises a valve element, a valve seat which is constituted by a tubular member and has a seating surface formed on an end surface on the valve element side of the tubular member, the seating surface being a plane having an annular shape on which the valve element is seated, a primary side passage that is a space located outside the tubular member, and a secondary side passage that is a space located inside the tubular member. Moreover, in another preferred aspect of the present invention, the flow control valve comprises a second secondary side passage that is a space located outside the primary side passage. In accordance with these configurations, fluid resistance in the secondary side passage of the flow control valve can be reduced.

Advantageous Effects of Invention

In accordance with the present invention apparatus, since a flow rate of a gas can be controlled by simultaneously using a plurality of flow control valves, a cross section S of a gap can be increased according to the number of the flow control valves. As a result, the maximum flow rate of the gas can be made larger than before even in a case where the pressure difference $\Delta P1$ between the primary side pressure P1 and the secondary side pressure P2 cannot be increased, such as a case where a gas with a low equilibrium vapor pressure PE(T) is used, for example. Therefore, a gas with a low equilibrium vapor pressure can be stably supplied to semiconductor manufacturing equipment, etc., at a large flow rate using the present invention apparatus.

DESCRIPTION OF EMBODIMENTS

Some embodiments of the present invention will be explained in detail below referring to drawings. However, the embodiments described here are merely exemplifications and embodiments of the present invention are not limited to the embodiments described here.

First Embodiment

FIG. 1 is a schematic block diagram for showing an example of a configuration of a flow controller according to a first embodiment of the present invention (which may be referred to as a "first apparatus" hereafter). The first apparatus 1a comprises a passage 2, a flow sensor 3 which measures a flow rate of a gas flowing through the passage 2, and two flow control valves 4 which control the flow rate of the gas flowing through the passage 2. FIG. 1 is a schematic view for exemplifying a relative spatial relation of respective components which constitute the first apparatus 1a, and does not show an actual layout of the respective components in the first apparatus 1a.

The passage 2 is prepared inside a base which is not shown, and communicates an inlet port and an outlet port of the gas, which are prepared on a surface of the base. All spaces, which are defined by a wall surface which contacts with the gas inside the base of the first apparatus 1a and inside which the gas flows through, correspond to the passage 2. The passage 2 may be a hole which is bored (drilled) in a main body of the base which the first apparatus 1a comprises, for example. Moreover, the passage 2 may be a space constituted by a surface which contacts with the gas of the constituent members of the first apparatus 1a, for example. Preferably, the surface which constitutes the passage 2 in the first apparatus 1a is constituted by a material which does not react with the gas when contacting with the gas. More preferably, the surface is constituted by corrosion-resistant metal, such as stainless steel, for example. From a viewpoint of making fluid resistance smaller and not obstructing a flow of the gas, it is preferable that the passage 2 is constituted so as to have as large cross section as possible and as few bending parts as possible, as a whole.

The flow sensor 3 is not limited in particular as long as it is possible to detect a mass flow rate of the gas which flows through the passage 2. As a specific example of such a flow sensor 3, a thermal type flow sensor, a pressure type flow sensor and a differential pressure type flow sensor, etc. can be mentioned, for example. Since configurations and operations of these flow sensors are well-known in the art, explanation thereof is omitted here.

The flow control valve 4 controls the flow rate of the gas which flows through the passage 2. The flow control valve 4 which the first apparatus 1a comprises may have any kinds of configurations, as long as the flow control valve 4 comprises a valve seat, a valve element and a drive unit thereof and can control the flow rate of the gas which flows through the passage 2. Specifically, a valve which has a well-known configuration, such as a diaphragm valve, a bellow valve, a ball valve and a needle valve, can be used as the flow control valve 4, for example. Preferably, the flow control valve 4 is a diaphragm valve. In this case, as a matter of course, a valve element which constitutes the flow control valve 4 is a diaphragm.

Moreover, as a drive unit of a valve element and/or valve seat, a well-known drive unit, such as a piezo-electric element driven with an electric voltage signal, a solenoid coil driven with an electric current signal, and a combination of a rotating machine with a gear or cam, can be used, for example. Moreover, the drive unit may drive a valve element and/or valve seat by contacting directly with the valve element and/or valve seat or by contacting indirectly a valve element and/or a valve seat through another member such as a rocker arm and a pressing member.

The first apparatus 1a comprises at least two flow control valves 4 which control the flow rate of the gas flowing through the passage 2. The number of the flow control valves 4 only has to be two or more, and may be three or four or more. All of the plurality of the flow control valves 4 which the first apparatus 1a comprises may have a same specification, or they may be a combination of a plurality of flow control valves which have specifications different from one another. When the configurations (for example, shapes of the branch passages 2c and positions in the passage 2, etc.) of the branch passages 2c in which the flow control valve 4 is formed are the same, it is preferable that all the flow control valves 4 have the same specification since the flow rate of the gas can be controlled more stably.

The passage 2 comprises, an inlet passage 2q that is a space which communicates with the inlet port 2p, a branching part 2a that is a space which communicates with the inlet passage 2q and branches a flow of the gas, branch passages 2c that are at least two spaces which communicate with the branching part 2a in parallel, a joining part 2b that is a space which communicates with the branch passages 2c and makes the flows of the gas join together, and an outlet passage 2s that is a space which makes the joining part 2b communicate with the outlet port 2r. Namely, in the first apparatus 1a, the gas which flows through the passage 2 is divided into at least two branch passages 2c at the branching part 2a, and joins together at the joining part 2b thereafter. The number of the branch passages 2c in the first apparatus 1a only has to be two or more, and may be three or four or more. When the number of the branch passages 2c is three or more, all the branch passages 2c may branch at a single branching part 2a, or a part or all of the branch passages 2c branched at a first branching part 2a may branch to be further branch passages 2c at a second branching part 2a. Similarly, the number of the joining parts 2b may also be single, or may be plural.

Output of the flow sensor 3 is used for control of the flow rate of the gas in the first apparatus 1a. For this reason, the flow sensor 3 is configured so as to detect a total flow rate of the gas which flows through the passage 2. In other words, the flow sensor 3 is configured so as to detect the sum of flow rates of the gas flowing through all the branch passages 2c, instead of each of the flow rates of the gas flowing through each of the branch passages 2c branched between the branching part 2a and the joining part 2b. Specifically, the flow rate of the gas before branching or the flow rate of the gas after joining can be measured by preparing one flow sensor 3 in either one of the inlet passage 2q or the outlet passage 2s in the passages 2, for example. Moreover, the total flow rate of the gas which flows through the passage 2 can be also detected by preparing the flow sensor 3 in each of all the branch passages 2c and totaling the flow rates of the gas flowing through the branch passages 2c, which are measured by the plurality of the flow sensors 3. Alternatively, when a ratio of a flow rate of the gas branched into a certain branch passage 2c and the flow rate of the gas branched into another branch passage 2c is known, the total flow rate of the gas which flows through the passage 2 can be calculated based on the flow rate of the gas flowing through a part of the branch passages 2c.

Furthermore, at least one of the flow control valves 4 is interposed in each of the branch passages 2c. Specifically, in each of the branch passages 2c, at least one flow control valve 4 is interposed such that a primary side passage of the flow control valve 4 communicates with a part on the upstream side of the branch passage 2c and a secondary side passage of the flow control valve 4 communicates with a part on the downstream side of the branch passage 2c. Since all the branch passages 2c comprise at least one flow control valve 4 as the above, the first apparatus 1a can make the gas flow, stop the flow of the gas, or control the flow rate of the gas. In the first apparatus 1a, the flow rate of the gas branched into the branch passage 2c can be controlled by using the flow control valves 4 prepared in every branch passage 2c.

For this reason, the sum of the cross sections S of the gaps of the plurality of the flow control valves 4 can be increased, without requiring a complicated structure in which the primary side passage and the secondary side passage branched so as to communicate with each of the plurality of the inlet ports and the plurality of the outlet ports formed in either one or the other of the valve seat surface of the valve seat member or the seating surface of the valve element member are formed like the flow control valve described in PTL2, for example. In the first apparatus 1a, the more the number of the branch passages 2c is increased, the more the number of the flow control valves 4 is increased, and the sum of the cross sections S of the gaps of the flow control valves 4 can be increased. Thereby, even in a case where the pressure difference $\Delta P1$ between the primary side pressure P1 and the secondary side pressure P2 cannot be increased, such as a case where a gas with a low equilibrium vapor pressure PE(T) is used, for example, the maximum flow rate of the gas can be made larger than before.

In addition, a switching action and an adjustment (increase and decrease) of a valve opening of the flow control valve 4, which the first apparatus 1a as mentioned above comprises, are performed by a control part which is not shown. Such a function as the control part can be realized by an electronic control unit (ECU), for example. The ECU comprises a microcomputer as its principal part, and comprises an input port for receiving a detection signal from the flow sensor 3 and an output port for transmitting a control signal to a drive unit which is not shown, etc. Thereby, the control part can output the control signal to the drive unit to control the valve opening of the flow control valve 4 such that the mass flow rate of the gas measured based on the detection signal output from the flow sensor 3 is in agreement with a set flow rate which is set up as a desired value.

Moreover, as will be mentioned later in detail, the first apparatus 1a may further comprise a heating device (not shown) configured so as to heat at least a part of the passage 2. In accordance with this, even in a case where a flow rate of a gas of a substance which has a low equilibrium vapor pressure and easily liquefies (or solidifies) by being cooled or pressure rise like the above-mentioned precursors, such as an organic metallic compound and/or a metal halide, etc., is to be controlled by the first apparatus 1a, liquefaction (or solidification) of the gas can be prevented, and the flow control thereof can be performed stably.

Second Embodiment

Generally, in a flow control valve, a pressure of the gas in the secondary side passage that is a space on the downstream side of the seating surface (secondary side pressure P2) is lower than a pressure of the gas in the primary side passage that is a space on the upstream side of a surface (seating surface) where the valve element is seated on the valve seat (primary side pressure P1). Therefore, in order to make fluid resistance smaller (a coefficient of capacity (Cv value) larger) to increase the maximum flow rate of the gas, it is preferable to increase a cross section of the secondary side passage as much as possible, and to decrease the number of bending parts in the secondary side passage as much as possible.

Then, a flow control valve which a flow controller according to a second embodiment of the present invention (which may be referred to as a "second apparatus" hereafter) is configured so as to be able to increase the cross section of the secondary side passage as much as possible and to decrease the number of bending parts in the secondary side passage as much as possible.

Specifically, the second apparatus is the flow controller according to various embodiments of present inventions including the above-mentioned first apparatus, wherein the flow control valve comprises, a valve element, a valve seat which is constituted by a tubular member and has a seating surface formed on an end surface on the valve element side of the tubular member, the seating surface being a plane having an annular shape on which the valve element is seated, a primary side passage that is a space located outside the tubular member, and a secondary side passage that is a space located inside the tubular member.

Figure 2:
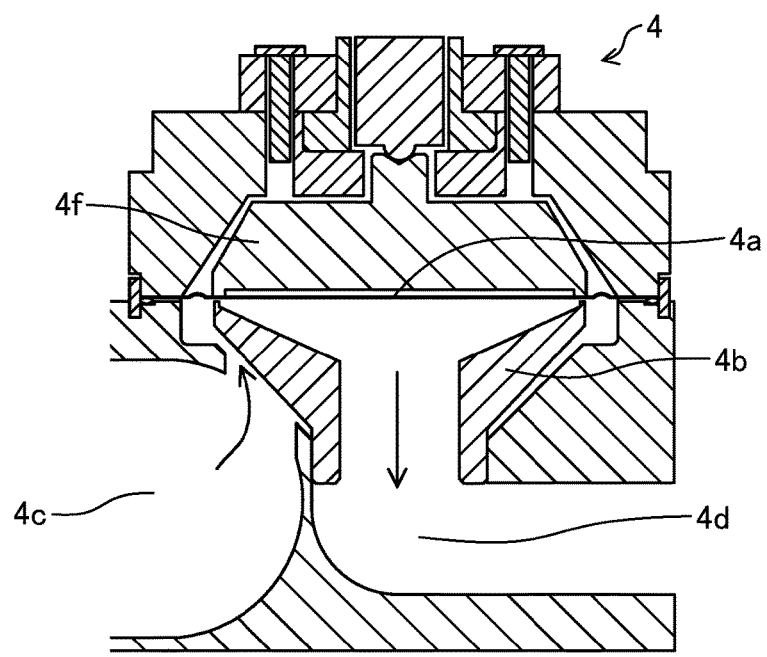
FIG. 2 is a schematic sectional view for showing an example of a configuration of a flow control valve which a flow controller according to a second embodiment of the present invention (second apparatus) comprises.

FIG. 2 is a schematic sectional view for showing an example of a configuration of a flow control valve which the second apparatus comprises. Hatched areas represent cross sections of members constituting the flow control valve 4. However, only a cross section of a valve element 4a is expressed by a bold line. Areas with neither a line nor a hatching represent a passage of a gas or a gap between the members. An arrow represents a direction in which the gas flows.

The flow control valve 4 exemplified in FIG. 2 comprises the valve element 4a constituted by a circular diaphragm, a valve seat 4b, a primary side passage 4c, and a secondary side passage 4d. The valve seat 4b is a valve seat which is constituted by a tubular member and has a seating surface formed on an end surface on the valve element 4a side of the tubular member. The seating surface is a plane having an annular shape on which the valve element 4a is seated. The primary side passage 4c is a space located outside the valve seat 4b. A part of the primary side passage 4c may be constituted by a surface on the outside of the valve seat 4b. The secondary side passage 4d is a space located inside the valve seat 4b. A part of the secondary side passage 4d may be constituted by a surface on the inside of the valve seat 4b.

In the flow control valve 4 exemplified in FIG. 2, a valve opening is adjusted (increased and decreased) by the valve element 4a being driven indirectly through a pressing member 4f by a drive unit which is not shown. Although the flow control valve 4 exemplified thus in FIG. 2 is a diaphragm valve in which the valve element 4a is constituted by the diaphragm, the flow control valve 4 which the flow controller according to the present invention including the first apparatus and the second apparatus (present invention apparatus) comprises is not limited to the diaphragm valve exemplified in FIG. 2.

As mentioned above, in general, the pressure P2 of the gas flowing through the secondary side passage 4d located on the downstream side of the gap of the flow control valve 4 is lower as compared with the pressure P1 of the gas flowing through the primary side passage 4c located on the upstream side of the gap. Therefore, in order to make fluid resistance smaller (a coefficient of capacity (Cv value) larger) to increase the maximum flow rate of the gas, it is preferable to increase the cross section of the secondary side passage 4d as much as possible, and to decrease the number of bending parts in the secondary side passage 4d as much as possible. On the other hand, as compared with the secondary side passage 4d, a shape of the primary side passage 4c may have a small cross section and/or many bending parts, to a certain degree. In other words, as for the primary side passage 4c, even when the primary side passage 4c has a some what complicated shape, it will not easily lead to a decrease in the maximum flow rate of the gas, as compared with the secondary side passage 4d.

However, in a flow control valve according to a conventional technology, comprising a valve seat which is constituted by a tubular member and has a seating surface formed on an end surface on a valve element side of the tubular member, it is common that a primary side passage is constituted by a space which has a relatively simple shape and is located inside the valve seat and a secondary side passage is constituted by a space which has a shape more complicated than the primary side passage and is located outside the valve seat. As a result, in the flow control valve according to the conventional technology, having such a configuration, it was difficult to make fluid resistance smaller (a coefficient of capacity (Cv value) larger) to increase the maximum flow rate of the gas.

On the other hand, in the second apparatus, the primary side passage 4c is constituted by the space which has a relatively complicated shape and is located outside the valve seat 4b and the secondary side passage 4d is constituted by the space which has a shape simpler than that of the primary side passage 4c and is located inside the valve seat 4b, as mentioned above. Namely, the gas flowing through the second apparatus flows into the flow control valve 4 through the primary side passage 4c that is the space located outside the valve seat 4b, passes the gap formed between the valve element 4a and the valve seat 4b from the outside to the inside, and thereafter flows out into the secondary side passage 4d that is the space located inside the valve seat 4b. Such a direction in which the gas flows is contrary to the direction in which the gas flows in the above-mentioned flow control valve according to the conventional technology.

As a result, in accordance with the second apparatus, fluid resistance can be made smaller (a coefficient of capacity (Cv value) larger) to increase the maximum flow rate of the gas.

Third Embodiment

As mentioned above, in order to increase the maximum flow rate of a gas in a flow control valve, it is effective to increase the cross section S of the gap formed between a seating surface of a valve seat and a surface of a valve element. In the flow control valve 4 which the above-mentioned second apparatus comprises, the gas flows into the secondary side passage 4d located inside the valve seat 4b from the primary side passage 4c located outside the valve seat 4b through the gap formed between the valve element 4a and the valve seat 4b. By further preparing a second secondary side passage in addition to the secondary side passage 4d located inside the primary side passage 4c and further preparing a seating surface which can form a gap communicating the primary side passage 4c and the second secondary side passage with each other in addition to the seating surface which can form a gap communicating the primary side passage 4c and the secondary side passage 4d with each other, the cross section S of the gap as the whole flow control valve can be increased, and the maximum flow rate of the gas can be increased.

Therefore, in a flow control valve which a flow controller according to a third embodiment of the present invention (which may be referred to as a "third apparatus" hereafter) comprises, a second secondary side passage is prepared outside the primary side passage 4c in addition to the secondary side passage 4d located inside the primary side passage 4c. Furthermore, in the flow control valve which the third apparatus" hereafter) comprises, a seating surface which can form a gap communicating the primary side passage 4c and the second secondary side passage with each other is further formed in addition to the seating surface which can form a gap communicating the primary side passage 4c and the secondary side passage 4d with each other.

Specifically, the third apparatus is a flow controller according to various embodiments of the present invention including the above-mentioned first apparatus, wherein the flow control valve comprises a valve element, a first valve seat which is constituted by a first tubular member and has a first seating surface formed on an end surface on the valve element side of the first tubular member, the first seating surface being a plane having an annular shape on which the valve element is seated, a second valve seat which is constituted by a second tubular member disposed so as to surround the first tubular member from an outer side of the first tubular member and has a second seating surface formed on an end surface on the valve element side of the second tubular member, the second seating surface being a plane having an annular shape on which the valve element is seated, a primary side passage that is a space located between the first tubular member and the second tubular member, a first secondary side passage that is a space located inside the first tubular member, and a second secondary side passage that is a space located outside the second tubular member.

Figure 3:
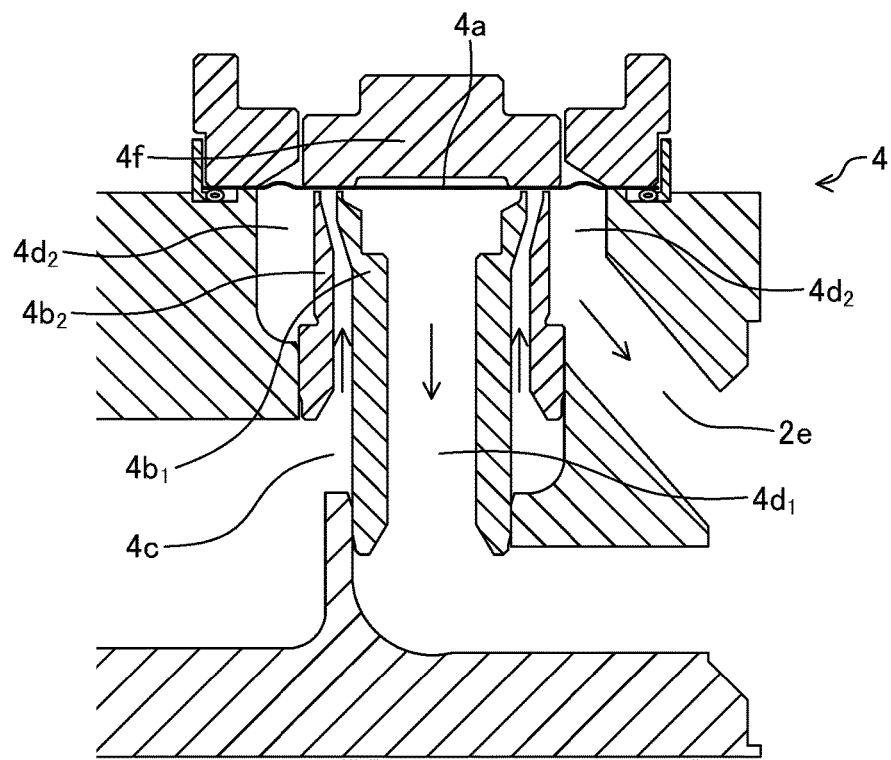
FIG. 3 is a schematic sectional view for showing an example of a configuration of a flow control valve which a flow controller according to a third embodiment of the present invention (third apparatus) comprises.

FIG. 3 is a schematic sectional view for showing an example of a configuration of a flow control valve which the third apparatus comprises. Hatched areas represent cross sections of members constituting the flow control valve 4. However, only a cross section of a valve element 4a is expressed by a bold line. Areas with neither a line nor a hatching represent a passage of a gas or a gap between the members. An arrow represents a direction in which the gas flows.

The flow control valve 4 exemplified in FIG. 3 comprises the valve element 4a constituted by a circular diaphragm, a first valve seat 4b1, a second valve seat 4b2, the primary side passage 4c, a first secondary side passage 4d1 and a second secondary side passage 4d2. The first valve seat 4b1 is a valve seat which is constituted by a first tubular member and has a first seating surface formed an end surface on the valve element 4a side of the first tubular member. The first seating surface is a plane having an annular shape on which the valve element 4a is seated. The second valve seat 4b2 is a valve seat which is constituted by a second tubular member disposed so as to surround the first tubular member from an outer side of the first tubular member and has a second seating surface formed on an end surface on the valve element 4a side of the second tubular member. The second seating surface is a plane having an annular shape on which the valve element 4a is seated.

The primary side passage 4c is a space located between the first tubular member and the second tubular member. A part of the primary side passage 4c may be constituted by a surface on the outside of the first valve seat 4b1 and a surface on the inside of the second valve seat 4b2. The first secondary side passage 4d1 is a space located inside the first tubular member. A part of the first secondary side passage 4d1 may be constituted by a surface on the inside of the first valve seat 4b1. The second secondary side passage 4d2 is a space located outside the second tubular member. A part of the second secondary side passage 4d2 may be constituted by a surface on the outside of the second valve seat 4b2.

As with the flow control valve 4 exemplified in FIG. 2, also in the flow control valve 4 which the third apparatus exemplified in FIG. 3 comprises, a valve opening is adjusted (increased and decreased) by the valve element 4a being driven indirectly through a pressing member 4f by a drive unit which is not shown. Although the flow control valve 4 exemplified thus in FIG. 2 is a diaphragm valve in which the valve element 4a is constituted by the diaphragm, the flow control valve 4 which the present invention apparatus including the first apparatus to the third apparatus comprises is not limited to the diaphragm valves exemplified in FIG. 2 and FIG. 3.

In the third apparatus, as mentioned above, the first secondary side passage 4d1 and the second secondary side passage 4d are prepared inside and outside the primary side passage 4c, respectively. Namely, the gas flowing through the third apparatus flows into the flow control valve 4 through the primary side passage 4c that is a space located between the first valve seat 4b1 and the second valve seat 4b2, passes the gap formed between the first valve seat 4b1 and the valve element 4a from the outside to the inside to flow out into the first secondary side passage 4d1, and passes the gap formed between the second valve seat 4b2 and the valve element 4a from the inside to the outside to flow out into the second secondary side passage 4d2. Thus, since the flow control valve 4 of the third apparatus comprises two valve seats (namely, the first valve seat 4b1 and the second valve seat 4b2), the area S of the gap can be approximately doubled as compared with the flow control valve 4 which the second apparatus exemplified in FIG. 2 comprises.

Furthermore, the flow control valve 4 which the third apparatus comprises further comprises the second secondary side passage 4d2 that is a space located outside the second tubular member, in addition to the first secondary side passage 4d1 that is a space located inside the first tubular member. Since the second secondary side passage 4d2 is formed further outside rather than the second seating surface located outside, a cross section of the second secondary side passage 4d2 is large, and an increasing effect in the cross section as the whole secondary side passage in association with the addition of the second secondary side passage 4d2 is large.

Therefore, in accordance with the flow control valve 4 which the third apparatus comprises, as compared with the flow control valve 4 which the second apparatus comprises, fluid resistance can be made further smaller (a coefficient of capacity (Cv value) can be made further larger), and the maximum flow rate of the gas can be increased further. Moreover, since the first seating surface of the first valve seat 4b1 and the second seating surface of the second valve seat 4b2 can be located close to each other, the surface of the valve element 4a driven by the pressing members 4f can be contacted (seated) certainly, and the flow of the gas can be intercepted (insulated) certainly.

Fourth Embodiment

In a third apparatus, as mentioned above, the gas which flows through the primary side passage 4c passes the gaps on the respective seating surfaces of the first valve seat 4b1 and the second valve seat 4b2, and is branched (split) into the first secondary side passage 4d1 and the second secondary side passage 4d2. Eventually, the flow of the gas branched in this way joins a flow of the gas flowing out of another flow control valve 4 at the above-mentioned joining part 2b, and is discharged from the third apparatus via the outlet port 2r.

A configuration of a path for joining the flows of the gas branched into the first secondary side passage 4d1 and the second secondary side passage 4d2 as mentioned above is not limited in particular. However, as mentioned above referring to FIG. 3, the second secondary side passage 4d2 is formed so as to surround the primary side passage 4c from the outside across the second valve seat 4b2, and is distributed over a wide range in the interior of the base of the flow control valve 4.

For this reason, when the gas which flowed out into the second secondary side passage 4d2 to be distributed over the wide range as mentioned above is to be led to the branch passages 2c or the joining part 2b via one path (namely, after being gathered at one position), there is a possibility that a flow path of the gas in the interior of the second secondary side passage 4d2 may become long, or a turbulent flow may arise in the flow of the gas to increase fluid resistance.

Then, the flow controller according to a fourth embodiment of the present invention (which may be referred to as a "fourth apparatus" hereafter) comprises at least two outlet paths which communicate directly with the second secondary side passage, and is configured such that the gas flows out of the second secondary side passage into the branch passages or the joining part via the outlet path.

As mentioned above, in the fourth apparatus, the gas which flowed out into the second secondary side passage to be distributed over the wide range as mentioned above is led to the branch passages or the joining part via at least two outlet paths which communicate directly with the second secondary side passage, rather than be led to the branch passages or the joining part via one path (namely, after being gathered at one position). In addition, "to comprise at least two outlet paths" means to comprise at least two outlet paths for each flow control valve, here. The gas which flowed out of the second secondary side passage via at least two outlet paths which communicate directly with the second secondary side passage may be led to the joining part via the branch passages which communicate with the joining part, or may be directly led to the joining part without going via the branch passages.

Figure 4:
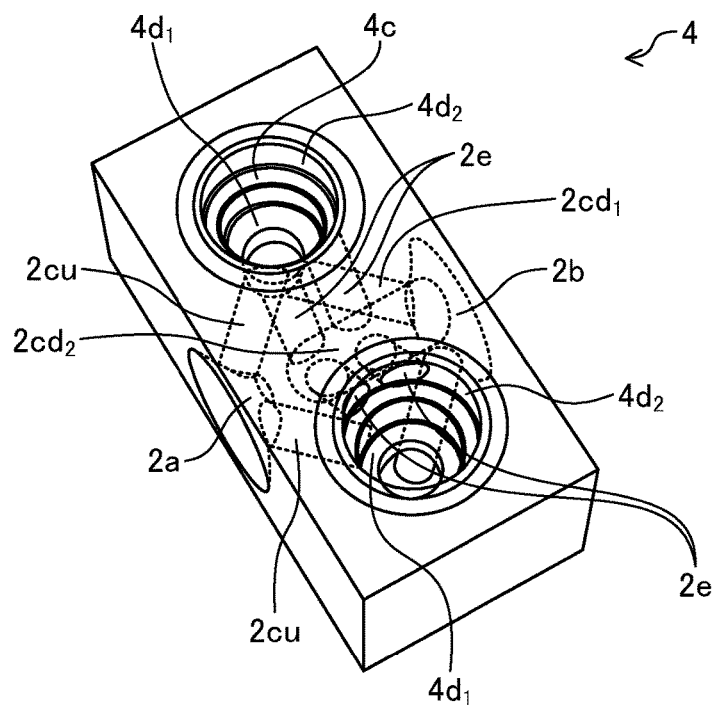
FIG. 4 is a schematic perspective view for showing an example of a configuration of a passage which a flow controller according to a fourth embodiment of the present invention (fourth apparatus) comprises.

FIG. 4 is a schematic perspective view for showing an example of a configuration of a passage which the fourth apparatus comprises. In FIG. 4, in order to intelligibly exemplify the configuration of the passage 2, valve elements and pressing members which two flow control valves comprise, etc. are omitted. Moreover, a shape of the passage 2 which cannot be seen from the outside is shown by broken lines. In the example shown in FIG. 4, a gas which flowed in from an inlet port (which is not shown) is branched into two upstream branch passages 2cu at a branching part 2a, is led to primary side passages 4c which two flow control valves comprise, and get over two seating surfaces to flow out into a first secondary side passage 4d1 and a second secondary side passage 4d2 in the respective flow control valves.

The gases which flowed out into the first secondary side passages 4d1 in the respective flow control values flow out into first downstream branch passages 2cd1 and are joined together at the joining part 2b. On the other hand, the gases which flowed out into the second secondary side passages 4d2 in the respective flow control valves flow out into the second downstream branch passages 2cd2 via two outlet paths 2e which communicate directly with the second secondary side passages 4d2, and are joined together at the joining part 2b.

As mentioned above, in the fourth apparatus exemplified in FIG. 4, the gases which flowed out into the second secondary side passage 4d2 to be distributed over the wide range are led to the second downstream branch passages 2cd2 via the two outlet paths 2e which communicate directly with the second secondary side passages 4d2, rather than be led to the branch passages or the joining part via one path (namely, after being gathered at one position). Thereby, a possibility that a flow path of the gas in the interior of the second secondary side passage 4d2 may become long, or a turbulent flow may arise in the flow of the gas to increase fluid resistance is reduced.

in addition, as mentioned above, at least two outlet paths 2e are also a part of the passage which communicate the inlet port and the outlet port with each other, and are prepared in the interior of the base which constitutes the fourth apparatus. Therefore, as with other parts which constitute the passage, also in the outlet paths 2e, its cross section can be increased and/or the number of bending parts can be decreased. Thereby, the maximum flow rate of a gas can be increased more than before even in a case where the pressure difference ΔP1 between the primary side pressure P1 and the secondary side pressure P2 cannot be increased, such as a case where a gas with a low equilibrium vapor pressure PE(T) is used.

Fifth Embodiment

As mentioned above, the flow control valve which the flow controller according to the present invention (present invention apparatus) comprises may have any kinds of configurations, as long as the he flow control valve comprises a valve seat, a valve element and a drive unit thereof and can control the flow rate of the gas which flows through the passage. As a specific example of such a flow control valve, for example, a valve which has a well-known configuration, such as a diaphragm valve, a bellow valve, a ball valve and a needle valve, can be mentioned and preferably the flow control valve which the present invention apparatus comprises is a diaphragm valve.

Therefore, the flow controller according to a fifth embodiment of the present invention (which may be referred to as a "fifth apparatus" hereafter) is a flow controller according to various embodiments of the present invention including the above-mentioned first to fourth apparatuses, wherein the valve element is a diaphragm. Since the flow control valves of the second apparatus and third apparatus exemplified in FIG. 2 and FIG. 3 comprise a diaphragm as the valve element 4a as mentioned above, they are also two specific examples of the flow control valve which the fifth apparatus comprises.

Namely, the flow control valve of the fifth apparatus comprises a diaphragm as a valve element. Typically, the diaphragm is a barrier constituted by a thin metal plate having a circular shape. One of two principal surfaces of the diaphragm faces a passage of a gas, and the other faces a space in communication with the open air. Therefore, the gas and the open air are isolated from each other by the diaphragm. A periphery part of the diaphragm is fixed at a reference position a predetermined distance apart from a seating plane that is a plane including the seating surface. Specifically, the periphery part of the diaphragm is fixed to another member with no clearance. It is preferable that the fixed portion of the diaphragm 2 and the member is maintained airtight by a gasket or other means such that the gas may not leak out. It is preferable that a bending part for facilitating a switching action and an adjustment (increase and decrease) of a valve opening of the first valve by deformation of the diaphragm is prepared a little inside the fixed portion of the diaphragm. By adopting a diaphragm as the valve element, the airtightness of the passage of the gas and drive performance of the flow control valve can be achieved by a simple structure.

It is preferable that the diaphragm is constituted by a thin plate of corrosion-resistant metal, such as stainless steel. Thereby, it becomes possible to control a flow rate of a gas corrosive to metal using the flow control valve. It is preferable that the thickness of the thin metal plate constituting the diaphragm is 0.2 mm or more and 0.5 mm or less. When the thickness of the diaphragm is 0.2 mm or more, the strength of the diaphragm becomes sufficient, and when it is 0.5 mm or less, deformation (driving) of the diaphragm by a pressing member becomes easier. More preferable thickness of the diaphragm 2 is 0.3 mm or more and 0.4 mm or less.

Sixth Embodiment

As mentioned above, in the atomic layer depositing method (ALD), gases made by vaporizing a precursor, such as an organic metallic compound and/or a metal halide, for example, using a vaporizer, etc. is used as a film forming material. Generally, these precursors have a large molecular weight, are liquids (or solids) at an ordinary temperature and a normal pressure, and easily liquefy (or solidify) in association with being cooled or pressure rise since its equilibrium vapor pressure is low. Therefore, in order to control flow rates of these gases and supply them to a semiconductor manufacturing equipment while preventing liquefaction (or solidification) of these gases, it is necessary to perform flow rate control while maintaining a temperature T at a high temperature and maintaining a state where the primary side pressure P1 and the secondary side pressure P2 do not exceed the equilibrium vapor pressure PE(T) at the temperature T.

Then, the flow controller according to a sixth embodiment of the present invention (which may be referred to as a "sixth apparatus" hereafter) is a flow controller according to various embodiments of the present invention including the above-mentioned first to fifth apparatuses, which further comprises a heating device configured so as to heat at least a part of the passage of a gas.

The heating device which the sixth apparatus comprises is not limited in particular, as long as it is possible to heat at least a part of the passage of the gas. As a specific example of such a heating device, a cartridge heater which is inserted in a hole bored (drilled) in a base constituting the sixth apparatus and generate heat by conducting electricity, etc., can be mentioned, for example. Alternatively, the heating device which the sixth apparatus comprises may be a heating block disposed to be able to contact with at least a part of regions of a surface of the base constituting the sixth apparatus such that heat conduction is possible. Such a heating block can comprise a massive member formed of a material with a high thermal conductivity, such as aluminum, for example, and a cartridge heater which is inserted in a hole bored in the massive member and generates heat by conducting electricity.

In accordance with the sixth apparatus, at least a part of the passage of the gas can be heated with a heating device as mentioned above. Therefore, even in a case where a flow rate of a gas of a substance which has a low equilibrium vapor pressure and therefore easily liquefies (or solidifies) by being cooled or pressure rise like the above-mentioned precursors used in the atomic layer depositing method (ALD), liquefaction (or solidification) of such a gas can be prevented more certainly.

In addition, as a modification of the sixth apparatus, at least a part of exposed surface of the sixth apparatus, such as an exposed surface of the sixth apparatus and/or an exposure surface of the above-mentioned heating block when the sixth apparatus comprises the heating block, may be covered with a heat insulating material. In accordance with this, effects, such as an improvement of the heating performance of the passage of the gas by the heating device and a reduction of an influence by an ambient environment on the temperature of the passage of the gas, can be attained, for example.

Seventh Embodiment

By the way, as mentioned above, a flow controller according to the present invention (present invention apparatus) comprises a passage of a gas branched into a plurality of branch passages in the interior of a base, and at least one flow control valve is interposed in each of the plurality of the branch passages. Namely, the present invention apparatus comprises a plurality of flow control valves disposed in parallel in the passage of the gas. Switching action and an adjustment (increase and decrease) of a valve opening of the plurality of these flow control valves can be performed by a drive unit which the present invention apparatus comprises contacting directly with a valve element and/or a valve seat to drive the valve element and/or the valve seat. Alternatively, the switching action and the adjustment (increase and decrease) of the valve opening of the plurality of these flow control valves can be performed by the drive unit which the present invention apparatus comprises contacting indirectly with a valve element and/or a valve seat through another member, such as a rocker arm and a pressing member, etc. to drive the valve element and/or the valve seat, for example.

A driving mechanism (a drive unit or a combination of a drive unit and another member) for driving a valve element and/or a valve seat as mentioned above can be prepared for each of a plurality of the flow control valves. However, from a viewpoint of reducing problems, such as an increase in size, complication of a configuration and control mechanism, and an increase in a manufacturing cost of a flow controller, it is preferable that at least a part of the plurality of the flow control valves is driven with a common driving mechanism.

Then, the flow controller according to the seventh embodiment of the present invention (which may be referred to as a "seventh apparatus" hereafter) is a flow controller according to various embodiments of the present invention including the above-mentioned first to sixth apparatuses, wherein at least two of the flow control valves among the at least two flow control valves (the flow control valves which the flow controller comprises) are configured so as to be driven by one common driving mechanism to have openings of the flow control valves changed.

A specific configuration of the one common driving mechanism which drives at least two flow control valves in the seventh apparatus is not limited in particular. For example, when a piezo-electric element driven with an electric voltage signal or a solenoid coil driven with an electric current signal is adopted as a drive unit, the plurality of the flow control valves can be driven simultaneously by disposing another member such as a rocker arm and a pressing member, etc., so as to contact with valve elements of the plurality of these flow control valves. Alternatively, when adopting a combination of a rotating machine with a gear or cam as a drive unit, for example, the plurality of the flow control valves can be driven simultaneously by disposing the gear or cam configured so as to contact with the valve elements of the plurality of these flow control valves on an output axis of the rotating machine, for example.

Figure 5:
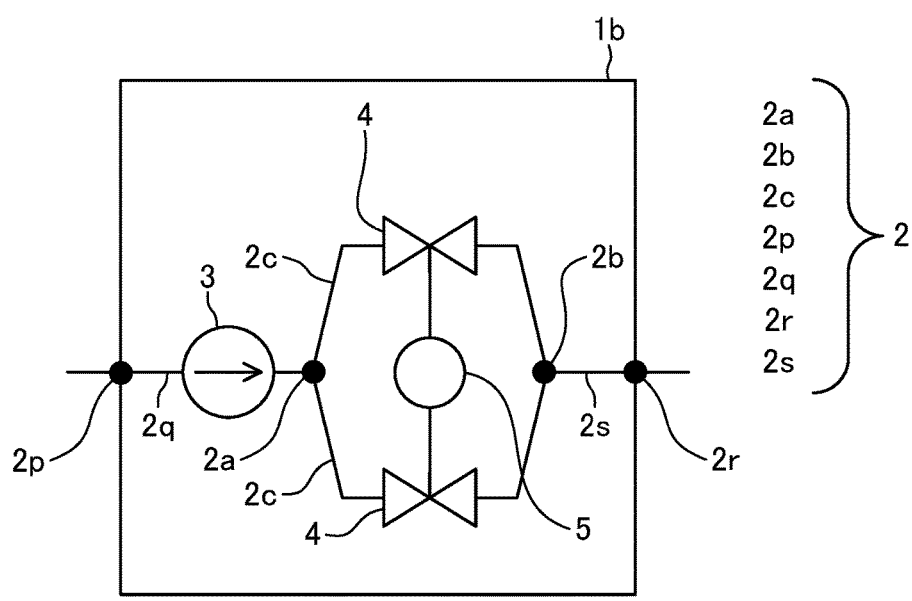
FIG. 5 is a schematic block diagram for showing an example of a configuration of a flow controller according to a seventh embodiment of the present invention (seventh apparatus).

FIG. 5 is a schematic block diagram for showing an example of a configuration of the seventh apparatus. The seventh apparatus 1b comprises a passage 2, a flow sensor 3 which measures a flow rate of a gas flowing through the passage 2, and two flow control valves 4 which control the flow rate of the gas flowing through the passage 2. FIG. 5 is a schematic view for exemplifying a relative spatial relation of respective components which constitute the seventh apparatus 1b, and does not show an actual layout of the respective components in the seventh apparatus 1b.

The seventh apparatus 1b has the same configuration as the first apparatus 1a shown in FIG. 1, except for the point that the seventh apparatus 1b is configured such that the two flow control valves 4 are driven with the one common driving mechanism 5 and valve openings thereof are changed simultaneously. Therefore, in the following explanation, a configuration of the driving mechanism 5 will be mainly explained and explanations about other components will be omitted.

Figure 6:
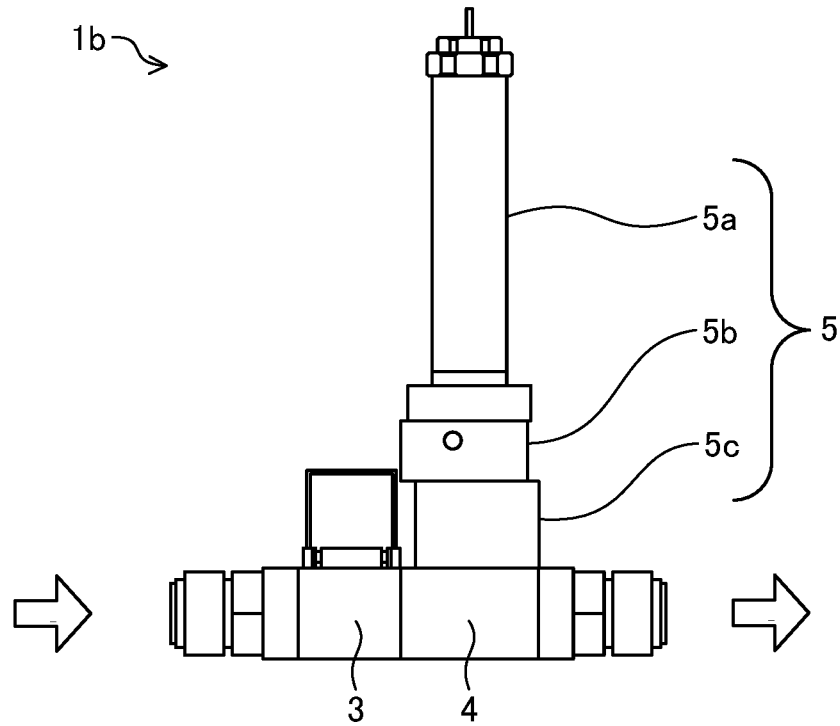
FIG. 6 is a schematic right side view for showing an example of the configuration of the seventh apparatus.
Figure 7:
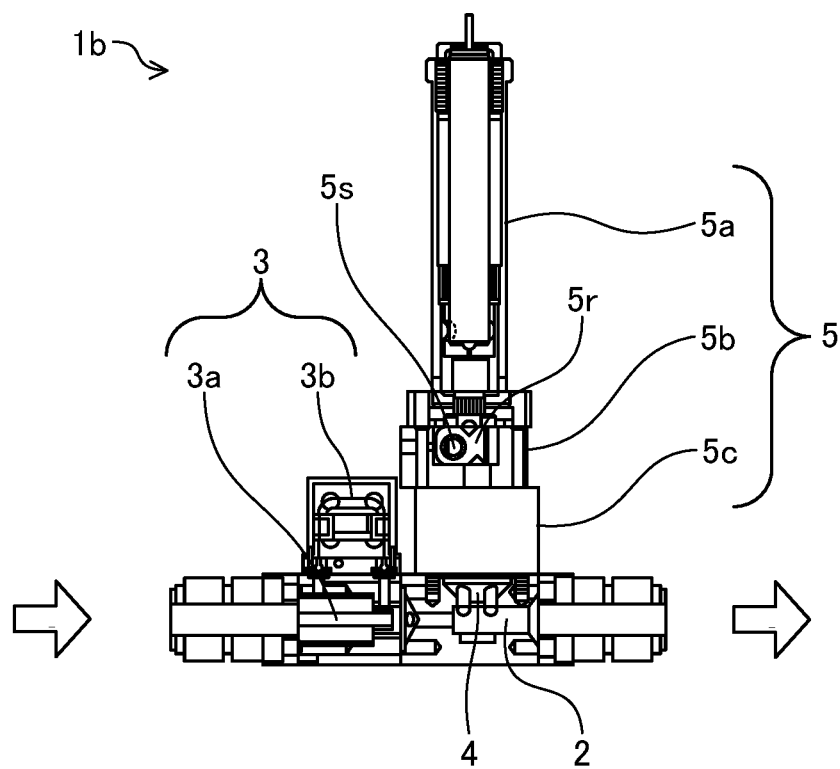
FIG. 7 is a schematic sectional view along a plane including axes of an inlet passage and outlet passage of the seventh apparatus shown in FIG. 6.
Figure 8:
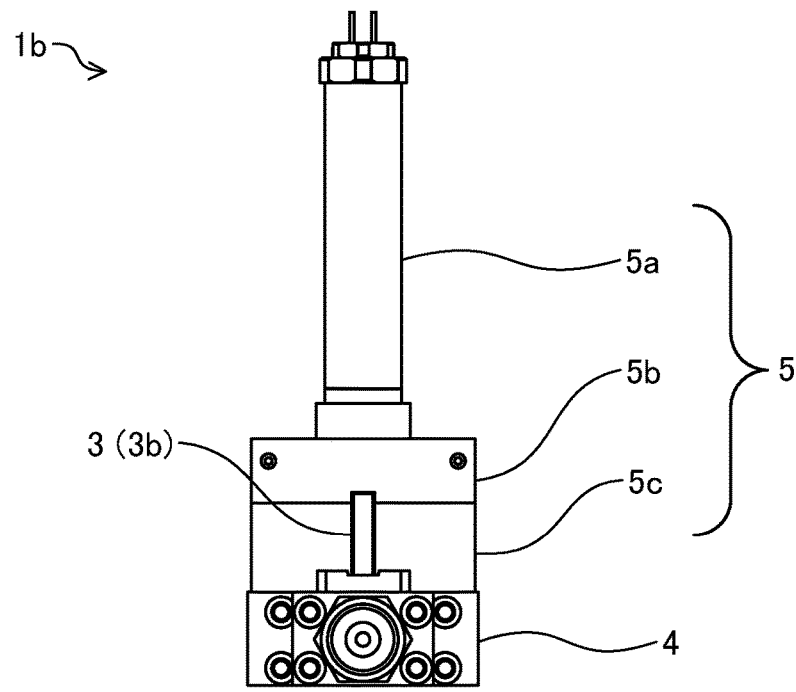
FIG. 8 is a schematic front view of the seventh apparatus shown in FIG. 6.
Figure 9:
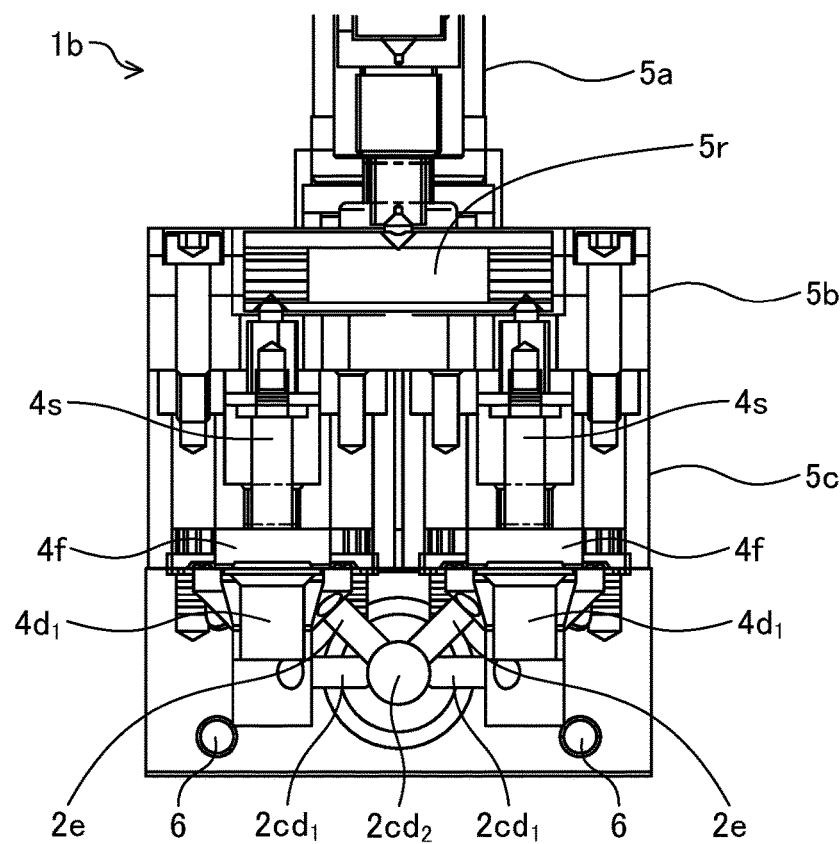
FIG. 9 is a schematic sectional view along a plane including an axis of a primary side passage of the seventh apparatus shown in FIG. 8.
Figure 10:
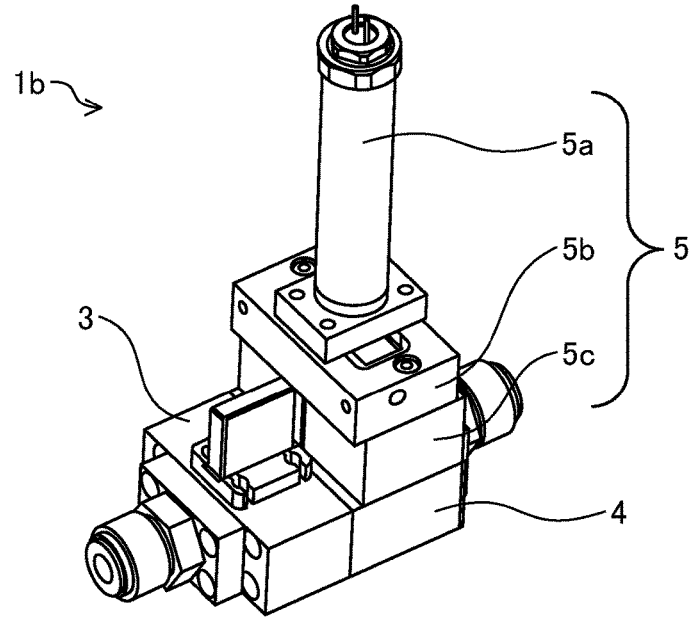
FIG. 10 is a schematic perspective view of the seventh apparatus shown in FIG. 6.
Figure 11:
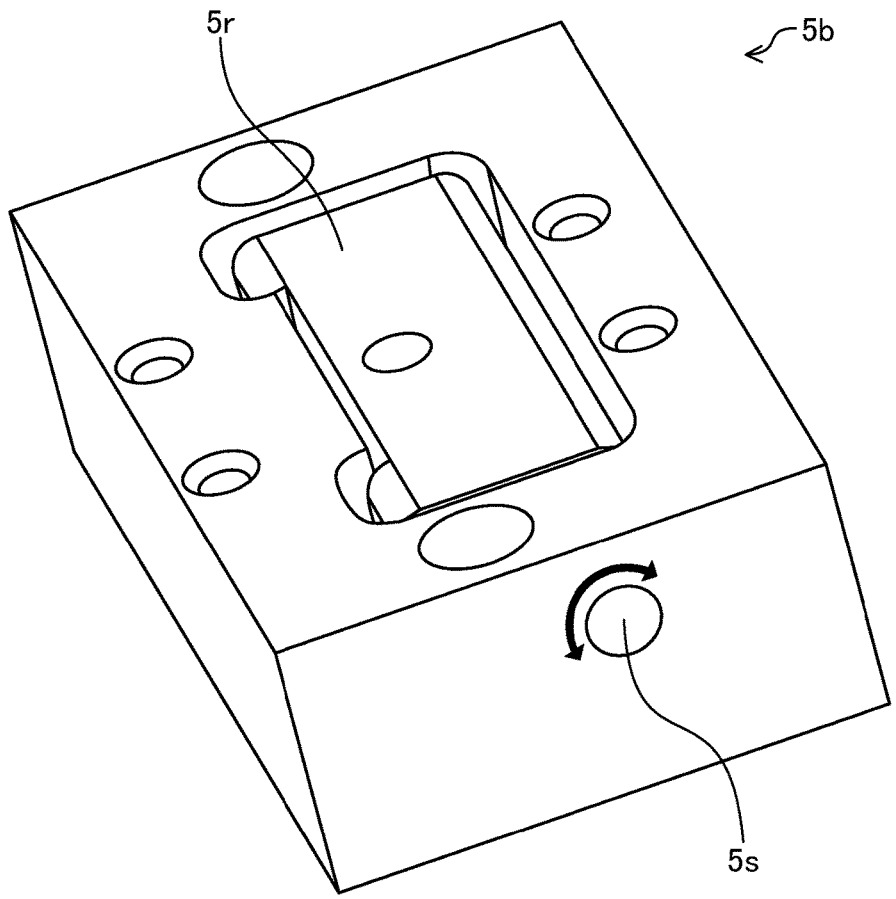
FIG. 11 is a schematic perspective view for showing an example of a configuration of a driving mechanism including a rocker arm for transmitting a movement of a drive unit to a valve element of a flow control valve which the seventh apparatus shown in FIG. 6 comprises.

FIG. 6 is a schematic right side view for showing an example of the configuration of the seventh apparatus 1b, and FIG. 7 is a schematic sectional view along a plane including axes of an inlet passage and outlet passage of the seventh apparatus 1b shown in FIG. 6. Moreover, FIG. 8 is a schematic front view of the seventh apparatus 1b shown in FIG. 6, and FIG. 9 is a schematic sectional view along a plane including an axis of a primary side passage of the seventh apparatus 1b shown in FIG. 8. Furthermore, FIG. 10 is a schematic perspective view of the seventh apparatus 1b shown in FIG. 6. In addition, FIG. 11 is a schematic perspective view for showing an example of a configuration of a first driving mechanism 5*b* including a rocker arm 5*r* for transmitting a movement of a drive unit 5*a* to a valve element of a flow control valve 4 which the seventh apparatus 1*b* shown in FIG. 6 comprises.

As shown in FIG. 6 to FIG. 8 and FIG. 10, the driving mechanism 5 which the seventh apparatus 1*b* comprises is constituted by the drive unit 5*a*, the first transfer mechanism 5*b* and the second transfer mechanism 5*c*. As shown in FIG. 7, The flow sensor 3 which the seventh apparatus 1*b* comprises is a thermal type flow sensor which comprises a bypass 3*a* prepared in the passage 2 of the gas, a sensor tube 3*b* which branches from the passage 2 of the gas on the upstream side of the bypass 3*a* and joins the passage 2 of the gas on the downstream side of the bypass 3*a*, and sensor wires (not shown) wound around the sensor tube 3*b*.

The drive unit 5*a* is a piezo-electric element driven with an electric voltage signal. The first transfer mechanism 5*b* includes the rocker arm 5*r* which transmits the movement of the drive unit 5*a* to the pressing members 4*f* which press the valve elements of the flow control valves 4. The second transfer mechanism 5*c* includes the pressing members 4*f* which are driven by the rocker arm 5*r* to press the valve elements of the flow control valves 4. The flow of the gas in the seventh apparatus 1*b* is shown by outlined white arrows in FIG. 6 and FIG. 7. Moreover, in the seventh apparatus 1*b*, joint parts for connection with other equipments are prepared in an inlet port that is an end on the upstream side and an outlet port that is an end on the downstream side in the flow of the gas, respectively.

As shown in FIG. 9, the seventh apparatus 1*b* is configured such that the two flow control valves 4 are driven by one common driving mechanism 5 and the valve openings thereof are changed simultaneously. Specifically, as shown by a bold solid two direction arrow in FIG. 11, the first transfer mechanism 5*b* is configured such that the rocker arm 5*r* is driven by the drive unit 5*a* to rotate around a rotation axis 5*s*. Namely, the rocker arms 5*r* exemplified in FIG. 11 is a kind of leverage which has a fulcrum (support point) which consists of the rotation axis 5*s*, one point of application (power point) driven by the drive unit 5*a*, and two pressure cone apexes (action points) which drive two stems 4*s*. The rocker arm 5*r* contacts with the two stems 4*s* prepared slidably in a displacement direction of the valve elements of the flow control valves 4 in the interior of the second transfer mechanism 5*c*, and drives the pressing members 4*f* of the two flow control valves 4 through these two stems 4*s*. The two pressing members 4*f* driven in this way respectively drive the valve element of the two flow control valves 4 and adjust the valve openings of the two flow control valves 4.

In addition, the seventh apparatus exemplified to FIG. 5 to FIG. 11 comprises two flow control valves, and is configured such that both of these two flow control valves are driven by one common driving mechanism. However, the number of the flow control valves which the seventh apparatus may comprise is not limited to two, and the seventh apparatus can comprise three or more flow control valves. In this case, the seventh apparatus may be configured such that all the three or more flow control valves are driven by one common driving mechanism, or may be configured such that a part (for example, two) of the three or more flow control valves is driven by one common driving mechanism.

As mentioned above, in the seventh apparatus, at least two flow control valves among the two or more flow control valves are configured so as to be driven by one common driving mechanism to have valve openings of the flow control valves changed. As a result, in accordance with the seventh apparatus, a plurality of flow control valves can be prepared, while reducing problems, such as an increase in size, complication of a configuration and control mechanism, and an increase in a manufacturing cost of a flow controller.

Figure 12:
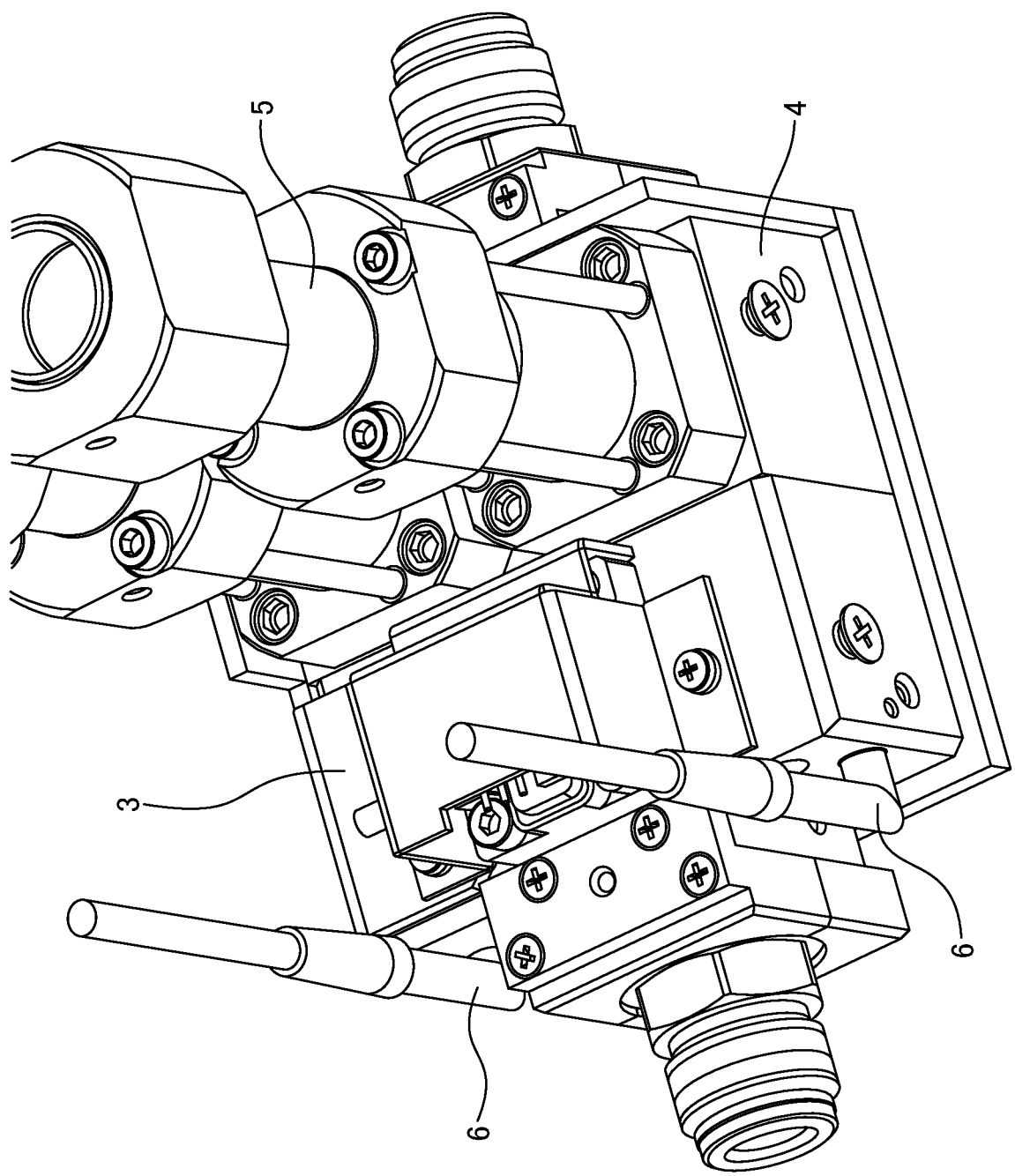
FIG. 12 is a schematic perspective view for showing an example of a cartridge heater according to a sixth embodiment of the present invention.

In some embodiments, and as illustrated in FIG. 12, a cartridge heater 6 as mentioned above in the sixth apparatus, may be inserted in a hole and may generate heat by conducting electricity.

Although some embodiments which have specific configurations have been explained, sometimes referring to the drawings, as the above, for the purpose of explaining the present invention, it should not be interpreted that the scope of the present invention is limited to these exemplary embodiments, and it is needless to say that it is possible to add modifications properly within the limits of matters described in the claims and specification.

REFERENCE SIGNS LIST

1*a* and 1*b*: Mass Flow Controller
2: Passage
2*a*: Branching Part
2*b*: Joining Part
2*c*: Branch Passage
2*cu*: Upstream Branch Passage
$2cd_1$: First Downstream Branch Passage
2*cd*2: Second Downstream Branch Passage
2*e*: Outlet Path
2*p*: Inlet Port
2*q*: Inlet Passage
2*r*: Outlet Port
2*s*: Outlet Passage
3: Flow sensor
3*b*: Sensor Tube
4: Flow Control Valve
4*a*: Valve Element
4*b*: Valve Seat
$4b_1$: First Valve Seat
$4b_2$: Second Valve Seat
4*c*: Primary Side Passage
4*d*: Secondary Side Passage
$4d_1$: First Secondary Side Passage
$4d_2$: Second Secondary Side Passage
4*f*: Pressing Member
5: Driving Mechanism
5*a*: Drive Unit
5*b*: First Transfer Mechanism
5*c*: Second Transfer Mechanism
5*r*: Rocker Arm
5*s*: Rotation Axis

The invention claimed is:

1. A flow controller comprising,
a base in which an inlet port and an outlet port of a gas are prepared on a surface of said base and a passage communicating said inlet port and said outlet port with each other is prepared inside said base,
a flow sensor which measures a flow rate of said gas flowing through said passage, and
at least two flow control valves which have the same specification and control the flow rate of said gas flowing through said passage,
wherein:
said passage comprises,
an inlet passage that is a space which communicates with said inlet port, a branching part that is a space which communicates with said inlet passage and branches a flow of said gas, branch passages that are at least two spaces which communicate with said branching part in parallel, a joining part that is a space which communicates with said branch passages and makes said flows of said gas join together, and an outlet passage that is a space which makes said joining part communicate with said outlet port, and said flow sensor is configured so as to detect a total flow rate of said gas which flows through said passage, and at least one of said flow control valves is interposed in each of said branch passages.

2. The flow controller according to claim 1, wherein:
said flow control valve comprises,
   a valve element,
   a valve seat which is constituted by a tubular member and has a seating surface formed on an end surface on said valve element side of said tubular member, said seating surface being a plane having an annular shape on which said valve element is seated,
   a primary side passage that is a space located outside said tubular member, and
   a secondary side passage that is a space located inside said tubular member.

3. The flow controller according to claim 2, wherein:
the valve element which said flow control valve comprises is a diaphragm.

4. The flow controller according to 2, wherein:
said flow controller further comprises a heating device configured to heat at least a part of said passage to prevent liquefaction or solidification of said gas.

5. The flow controller according to claim 2, wherein:
at least two of said flow control valves among said flow control valves are configured to be driven by one common mechanical driving mechanism to have openings of said flow control valves changed.

6. The flow controller according to claim 1, wherein:
said flow control valve comprises,
   a valve element,
   a first valve seat which is constituted by a first tubular member and has a first seating surface formed on an end surface on said valve element side of said first tubular member, said first seating surface being a plane having an annular shape on which said valve element is seated,
   a second valve seat which is constituted by a second tubular member disposed so as to surround said first tubular member from an outer side of said first tubular member and has a second seating surface formed on an end surface on said valve element side of said second tubular member, said second seating surface being a plane having an annular shape on which said valve element is seated,
   a primary side passage that is a space located between said first tubular member and said second tubular member,
   a first secondary side passage that is a space located inside said first tubular member, and
   a second secondary side passage that is a space located outside said second tubular member.

7. The flow controller according to claim 6, wherein:
said flow controller further comprises at least two outlet paths which communicate directly with said second secondary side passage, and said flow controller is configured such that said gas flows out of said second secondary side passage into said branch passages via said outlet path.

8. The flow controller according to claim 7, wherein:
the valve element which said flow control valve comprises is a diaphragm.

9. The flow controller according to claim 7, wherein:
said flow controller further comprises a heating device configured to heat at least a part of said passage to prevent liquefaction or solidification of said gas.

10. The flow controller according to claim 7, wherein:
at least two of said flow control valves among said flow control valves are configured to be driven by one common mechanical driving mechanism to have openings of said flow control valves changed.

11. The flow controller according to claim 6, wherein:
the valve element which said flow control valve comprises is a diaphragm.

12. The flow controller according to claim 6, wherein:
said flow controller further comprises a heating device configured to heat at least a part of said passage to prevent liquefaction or solidification of said gas.

13. The flow controller according to claim 6, wherein:
at least two of said flow control valves among said flow control valves are configured to be driven by one common mechanical driving mechanism to have openings of said flow control valves changed.

14. The flow controller according to claim 1, wherein:
a valve element which said flow control valve comprises is a diaphragm.

15. The flow controller according to claim 14, wherein:
said flow controller further comprises a heating device configured to heat at least a part of said passage to prevent liquefaction or solidification of said gas.

16. The flow controller according to claim 14, wherein:
at least two of said flow control valves among said flow control valves are configured to be driven by one common mechanical driving mechanism to have openings of said flow control valves changed.

17. The flow controller according to claim 1, wherein:
said flow controller further comprises a heating device configured to heat at least a part of said passage to prevent liquefaction or solidification of said gas.

18. The flow controller according to claim 17, wherein:
at least two of said flow control valves among said flow control valves are configured to be driven by one common mechanical driving mechanism to have openings of said flow control valves changed.

19. The flow controller according to claim 1, wherein:
at least two of said flow control valves among said flow control valves are configured to be driven by one common mechanical driving mechanism to have openings of said flow control valves changed.

* * * * *